United States Patent
Bass et al.

[11] 3,771,846
[45] Nov. 13, 1973

[54] BEARING

[75] Inventors: Merlyn Duane Bass; Donald Herbert Pettengill, both of Ottumwa, Iowa

[73] Assignee: Deere & Company, Moline, Ill.

[22] Filed: Mar. 6, 1972

[21] Appl. No.: 232,046

[52] U.S. Cl. .................................................. 308/238
[51] Int. Cl. .......................................... F16c 33/20
[58] Field of Search ...................... 308/238, DIG. 7, 308/26

[56] References Cited
UNITED STATES PATENTS

| | | | |
|---|---|---|---|
| 2,725,264 | 11/1955 | Bodine, Jr. | 308/DIG. 7 |
| 3,194,615 | 7/1965 | Weasler | 308/238 |
| 3,380,791 | 4/1968 | Peck | 308/238 |
| 3,451,705 | 6/1969 | Turpen | 308/238 |
| 2,666,677 | 1/1954 | Miller | 308/238 |
| 3,008,779 | 11/1961 | Spriggs | 308/238 |
| 3,236,573 | 2/1966 | Donnellan | 308/238 |
| 3,637,273 | 1/1972 | Orndorff, Jr. | 308/238 |

Primary Examiner—Charles J. Myhre
Assistant Examiner—Barry Grossman
Attorney—H. Vincent Harsha et al.

[57] ABSTRACT

A resilient bearing member for rotatably supporting a tube concentrically within a cylindrical holder, the member having a cylindrical wall portion with an axially extending split therein and a plurality of circumferentially spaced, axially extending weakened sections operative as hinges to permit the member to be inserted radially into position on the tube. A pair of radially inwardly extending projections on the inner surface of the bearing member engage apertures in the tube wall to axially and rotatably lock the member to the tube. When assembled, with the bearing member and tube, the cylindrical holder prevents removal of the former from the latter.

10 Claims, 4 Drawing Figures

PATENTED NOV 13 1973　　3,771,846

BEARING

BACKGROUND OF THE INVENTION

The present invention relates generally to bearing apparatus and more particularly to a resilient, unitary bearing member having simplified means for permitting the member to be inserted and retained in position on a shaft or other support member.

It is known in the bearing art to provide a resilient bearing member having a generally cylindrical wall with an axially extending split therein, and to include one or more axially extending weakened sections in the wall to act as hinges so that the edges of the split can be separated a distance sufficient to permit radial insertion of the member on a shaft. Examples of such bearing members are illustrated in U.S. Pat. Nos. 3,194,615 issued 13 July 1965 to Weasler and 3,451,705 issued 24 June 1969 to Turpen.

The bearings disclosed in these patents are constructed to rotate freely with respect to both of the relatively rotatable members which they support, and are retained axially in position by means of a collar or shoulder formed on one of the members. In certain applications, however, it is desirable to rotatably lock the bearing to one of the relatively rotatable members, so that only one surface of the bearing is subjected to frictional wear. Conventional methods have been employed in the past to prevent rotation between the bearing and one of the relatively rotatable members. For example, it is known to rotatably lock such a bearing to a shaft by means of a bolt extending through the shaft and the walls of the bearing member. Such conventional retention means, although functionally adequate, substantially detract from the simplicity and economy of this type of bearing member.

SUMMARY OF THE INVENTION

Accordingly, it is the primary object of the present invention to provide a bearing member of the type described having simplified means for rotatably, as well as axially, locking the member to one of the relatively rotatable members which it supports. More particularly, it is an object of the invention to provide such a bearing member wherein said simplified means are formed as an integral part of the member and necessitate a minimum effort to effect a lock between the bearing member and one of the relatively rotatable members.

In accordance with these and other objects, the invention comprises, generally, a resilient bearing member for supporting a tube concentrically within a cylindrical holder, the member having a cylindrical wall portion with an axially extending split therein and at least one axially extending weakened section serving as a hinge to permit the edges of the split to be separated so that the member can be inserted radially on the tube. The member is rotatably and axially locked to the tube by means of at least one radially inwardly extending projection formed integrally with the bearing member wall, the projection being engageable with an aperture in the tube wall. When assembled with the bearing member and tube, the cylindrical holder acts to prevent removal of the former from the latter. In its preferred embodiment, the bearing member includes a pair of diametrically opposed projections engageable with a corresponding pair of apertures in the tube wall, a first pair of circumferentially spaced, axially extending grooves in the wall of the member on one side of the projections, a second pair of circumferentially spaced, axially extending grooves in the wall of the member on the other side of the projections, and an axially extending split in the wall between one pair of grooves.

BRIEF DESCRIPTION OF THE DRAWINGS

The preferred embodiment of the present invention will be described in conjunction with the accompanying drawings in which.

DESCRIPTION OF THE PREFERRED EMBODIMENT

Figure 1:
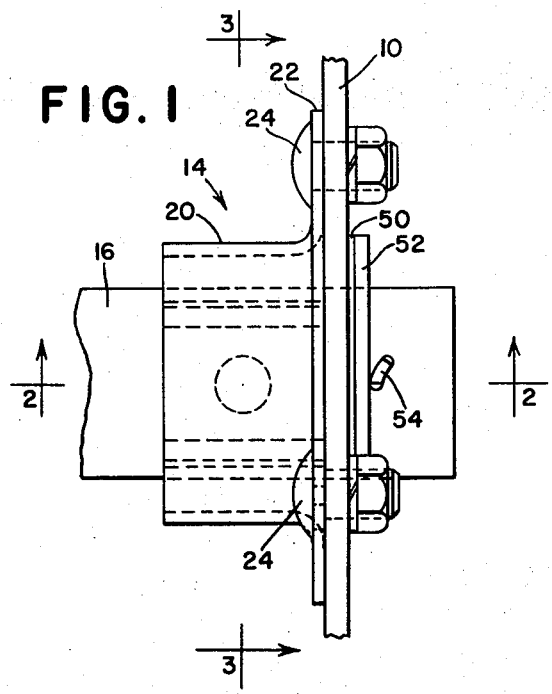
FIG. 1 is a side view of the bearing apparatus of the invention.

Referring now to the drawings, the bearing apparatus of the invention comprises, generally, a mounting plate 10 having a circular opening 12 therein, a bearing holder 14 connected to the plate 10 and extending outwardly therefrom, a tube 16 extending through the holder 14 and the opening 12 in the plate 10, and a resilient bearing member 18 rotatably supporting the tube 16 concentrically within the holder 14.

The holder 14 includes a cylindrical tubular portion 20 which supports the bearing member 18, and an integral six-sided flange portion 22 which engages the side of the mounting plate 10 and is secured thereto by means of three equally spaced bolts 24. As shown best in FIG. 2, the diameter of the bore in the cylindrical portion 20 is less than the diameter of the opening 12 in the plate 10, and a circular portion 26 of the flange 22 thus extends radially between the edge of the opening 12 and the bore in the holder portion 20.

Figure 4:
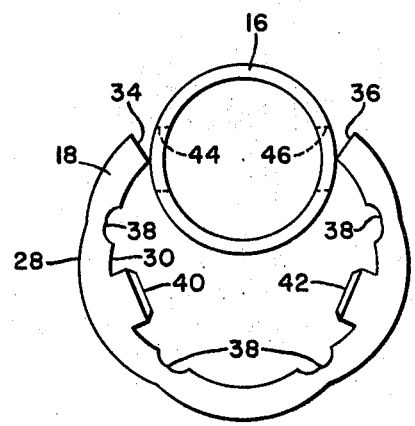
FIG. 4 is an end view of the tube and bearing member illustrating the manner in which the latter is inserted radially into position on the former.

The bearing member 18, preferably composed of a moldable plastic material having low friction characteristics, comprises a generally cylindrical wall portion having a smooth outer surface 28 substantially conforming to the bore in the holder portion 20 and rotatably receivable therein. The inner surface 30 of the bearing member wall has a cylindrical shape concentric with the surface 28 and substantially conforming to the outer surface of the tube 16. The wall of the member 18 includes an axially extending split 32 defined by normally adjacent, axially extending edge portions 34 and 36. The wall further includes four axially extending weakened sections produced by U-shaped grooves 38 equally circumferentially spaced around its inner surface 30, the split 32 being located midway between one adjacent pair of grooves. As illustrated in FIG. 4, the weakened areas produced by the grooves 38 act as hinges to permit the edges 34 and 36 of the split 32 to be separated so that the member 18 can be inserted radially over the tube 16.

Figure 2:
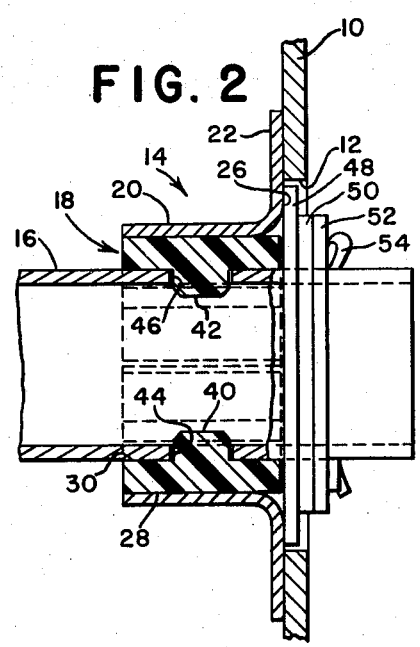
FIG. 2 is a sectional view taken generally along the line 2—2 of FIG. 1.
Figure 3:
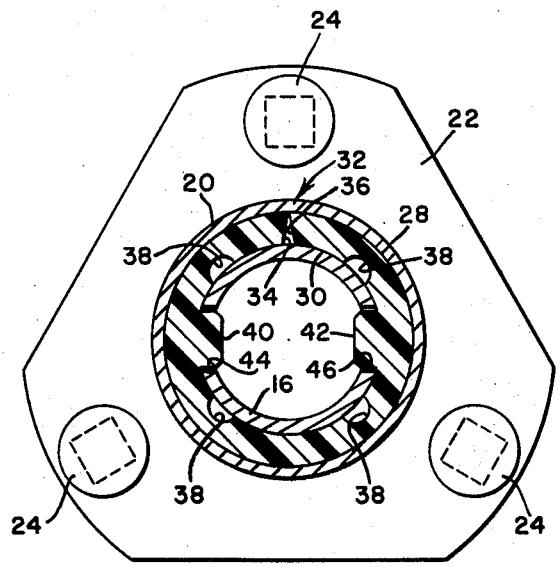
FIG. 3 is a sectional view taken generally along the line 3—3 of FIG 1.

The bearing member 18 is locked both axially and rotatably to the tube 16 by a pair of diametrically opposed projections 40 and 42 formed integrally with the wall of the member and extending radially inwardly from the inner surface 30 thereof. When positioned on the tube as shown in FIGS. 1–3, the projections 40 and 42 on the member 18 are received by apertures 44 and 46, respectively, formed in the tube wall. The apertures 44 and 46 are just slightly larger than the projections 42 and 44 so as to prevent any substantial relative axial or rotational movement between the member 18 and the tube 16.

As is apparent from the drawings, the projections 40 and 42 are centered on a diametrical line disposed 90° from the split 32 and 45° from the adjacent grooves 38, there being a first pair of grooves 38 in the area between the projections opposite the split 32 and a second pair of grooves 38 in the area between the projections including the split 32 and on opposite sides thereof. It will be seen that this particular arrangement, referring again to FIG. 4, permits the edge portions 34 and 36 forming the split 32 to be separated a distance equal to the diameter of the tube 16, and simultaneously permits the projections 40 and 42 to be separated a distance sufficient to clear the edges of the apertures 44 and 46 in the tube wall, both with substantially equal bending occurring at each of the four hinge means. Since the hinge areas bend substantially equal amounts, each of the grooves 38 need have a depth sufficient only to produce the minimum required bend in the adjacent portion of the bearing member wall. The strength of the bearing wall at each of the hinge areas will thus be substantially the same, which will result in a generally uniform distrubution of wear around the outer surface of the member.

Referring now to FIG. 2, a flat washer 48 is received on the end portion of the tube 16 extending through the opening 12 in the mounting plate 10, the washer 48 having an outer diameter greater than the diameter of the bore in the holder portion 20 and less than the diameter of the opening 12 so that it fits within the opening 12 and engages the flange portion 26 of the bearing holder 14. A further pair of washers 50 and 52 are received on the outer end of the tube 16 and are retained thereon by means of a cotter key 54 extending through the walls of the tube. The washers 48, 50, and 52 and the cotter key 54 thus act to transmit thrust loads acting on the tube from right to left as viewed in FIGS. 1 and 2 to the flange portion 26 of the bearing holder 14 and thus ultimately to the mounting plate 10.

I claim:

1. A resilient bearing member for rotatably supporting a tube concentrically within a cylindrical holder, the wall of said tube having a pair of diametrically opposed apertures therein, said bearing member having a wall with a cylindrical outer surface generally conforming to said cylindrical holder and an inner surface adapted to support said tube in concentric relation with said cylindrical holder, said bearing member wall having a pair of diametrically opposed projections extending radially inwardly from the inner surface thereof and formed integrally therewith, said projections being receivable within the apertures in the tube wall to retain said bearing member axially and rotatably rigid with said tube, the wall of said bearing member having an axially extending split therein between said projections and defined by adjacent edge portions, said bearing member wall further having at least one axially extending weakened section in the area between said projections opposite said split, said weakened section acting as a hinge to permit said edge portions to be moved apart from each other a distance sufficient to permit insertion of said bearing member radially into position on said tube, with the inwardly extending projections of the former received within the apertures in the wall of the latter.

2. The invention defined in claim 1 wherein said weakened section comprises an axially extending groove formed in the wall of said bearing member.

3. The invention defined in claim 2 wherein said groove is formed in the inner surface of said bearing member wall.

4. The invention defined in claim 1 wherein said split is disposed substantially 90° circumferentially from the centers of said projections.

5. The invention defined in claim 4 wherein said bearing member wall has four, equally circumferentially spaced, axially extending weakened sections.

6. The invention defined in claim 5 wherein each of said weakened sections is disposed substantially 90° from the center of one of said projections.

7. A resilient bearing member for rotatably supporting a tube concentrically within a cylindrical holder, the wall of said tube having a pair of diametrically opposed apertures therein, said bearing member having a wall with a cylindrical outer surface generally conforming to said cylindrical holder and an inner surface adapted to support said tube in concentric relation with said cylindrical holder, said bearing member wall having a pair of diametrically opposed projections extending radially inwardly from the inner surface thereof and formed integrally therewith, said projections being receivable within the apertures in the tube wall to retain said bearing member circumferentially rigid with said tube, the wall of said bearing member having an axially extending split therein between said projections and defined by adjacent edge portions, said bearing member wall further having a first pair of circumferentially spaced, axially extending weakened sections in the area between said projections opposite said split, and a second pair of circumferentially spaced, axially extending weakened sections in the area between said projections including said split and on opposite sides of said split, said weakened sections acting as hinges to permit said edge portions to be moved apart from each other a distance at least as great as the outer diameter of said tube, whereby said bearing member can be inserted radially into position on said tube with the inwardly extending projections of the former received within the apertures in the wall of the latter.

8. The invention defined in claim 7 wherein said weakened sections are equally circumferentially spaced and each of said sections is disposed substantially 45° from the center of one of said projections.

9. The invention defined in claim 8 wherein said weakened sections are formed by axially extending grooves in the inner surface of said bearing member wall.

10. Bearing apparatus comprising: a mounting plate having an opening therein; a bearing holder mounted on said mounting plate and having a cylindrical bore communicating with the opening in said plate, said holder including a flanged portion extending radially between the periphery of the opening in said plate and the wall of the bore in said holder; a tube having an outer diameter less than the diameter of the bore in said holder, the wall of said tube having a pair of diametrically opposed apertures therein; a bearing member for rotatably supporting said tube concentrically within the bore in said holder and having a wall with a cylindrical outer surface generally conforming to the wall of the bore in said holder and an inner surface adapted to support said tube concentrically within the bore in said holder, said bearing wall having a pair of diametrically opposed, radially inwardly extending projections receivable within the apertures in said tube wall to lock said bearing member axially and rotatably to said tube, said bearing member wall further having an axially extending split, and an axially extending weakened section in the area between said projections opposite said split, said split being operative as a hinge to permit radial insertion of said bearing member on said tube with the projections of the former received within the apertures in the wall of the latter, said bearing holder being operative when supporting said bearing member and said tube to prevent removal of said bearing member from said tube; a washer on said tube and within the opening in said mounting plate, said washer being engageable with the flanged portion of said bearing holder; and means for limiting the axial movement of said washer relative to said tube whereby said washer is operable to transmit axial thrust loads imposed on said tube to said holder.

* * * * *

UNITED STATES PATENT OFFICE
CERTIFICATE OF CORRECTION

Patent No. 3,771,846          Dated 13 November 1973

Inventor(s) Merlyn Duane Bass and Donald Herbert Pettengill

It is certified that error appears in the above-identified patent and that said Letters Patent are hereby corrected as shown below:

Column 4, line 16, change "$90°$" to -- $45°$ --.

Signed and sealed this 9th day of April 1974.

(SEAL)
Attest:

EDWARD M. FLETCHER, JR.           C. MARSHALL DANN
Attesting Officer          Commissioner of Patents